Figure 1:
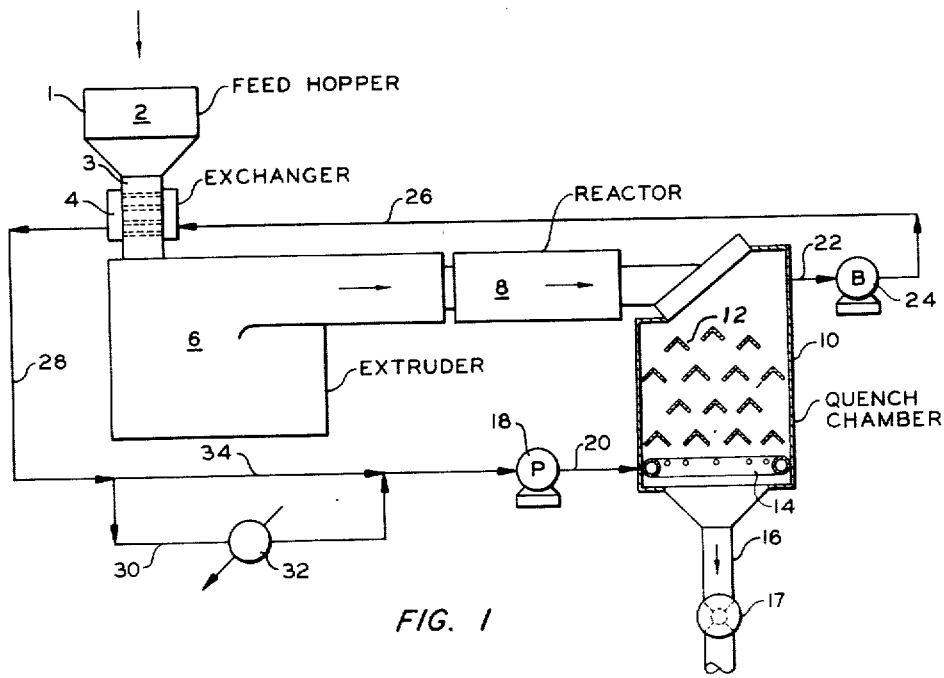

April 30, 1963   W. H. WHITTINGTON   3,087,922
METHOD AND APPARATUS FOR PYROLYZING POLYMERS
Filed May 13, 1958

INVENTOR.
W. H. WHITTINGTON

BY
Hudson and Young
ATTORNEYS

United States Patent Office

3,087,922
Patented Apr. 30, 1963

3,087,922
METHOD AND APPARATUS FOR PYROLYZING POLYMERS
William H. Whittington, Bartlesville, Okla., assignor to Phillips Petroleum Company, a corporation of Delaware
Filed May 13, 1958, Ser. No. 734,978
7 Claims. (Cl. 260—94.9)

This invention relates to method and means for pyrolyzing normally solid olefin polymers. In one aspect the invention relates to method and means for improving the extrudability of normally solid olefin polymers.

It is known in the art to convert olefin polymers of high molecular weight, high density and high crystallinity to materials of lower molecular weight and lower melting point. For example, high molecular weight, highly dense crystalline polymers of 1-olefins prepared by contacting a 1-olefin such as ethylene, propylene, 1-butene, etc. at a temperature in the range of 150 to 450° F. with a catalyst comprising as its essential ingredient chromium in the form of chromium oxide including a substantial proportion of hexavalent chromium associated with at least one oxide selected from the group consisting of silica, alumina, zirconia, and thoria, are converted to materials having lower molecular weights and lower melting points by pyrolyzing said polymers at temperatures in the range of 600 to 900° F. for a period of time usually not exceeding about 30 minutes.

Also difficultly extrudable olefin polymers, having molecular weights about 60,000 to 90,000, prepared by contacting a 1-olefin such as ethylene, propylene, 1-butene etc., at temperatures up to about 220° F. with a catalyst comprising chromium oxide including a substantial amount of hexavalent chromium associated with at least one of silica, alumina, zirconia, and thoria, can be converted by pyrolysis to more readily extrudable polymers. The pyrolysis is generally carried out at a temperature in the range of 600 to 900° F. with the residence time of from about 1 to about 10 minutes.

It is an object of this invention to provide improved method and means for pyrolyzing normally solid olefin polymers.

Another object of the invention is to provide improved method and means for improving the extrudability of olefin polymers.

Still another object of the invention is to provide improved method and means for converting high molecular weight, highly dense crystalline polymers to materials of lower molecular weight and lower melting point.

Yet another object of the invention is to provide improved method and means for converting olefin polymers of low melt index to polymers of higher melt index.

These and other objects of the invention will become more readily apparent from the following detailed description and discussion.

The foregoing objects are realized in one aspect of the invention by the process of preheating a polymer in a preheating zone, pyrolyzing the preheated polymer, cooling the pyrolyzed polymer with a cooling fluid and utilizing the cooling fluid thereafter to transfer heat to the polymer in the preheating zone.

In another aspect of the invention a polymer is pyrolyzed by passing it through a pyrolysis zone in the form of a fluid stream having annular cross-section and transferring heat of pyrolysis to said polymer through the interior and exterior boundaries of said stream.

In still another aspect of the invention, there is provided for carrying out polymer pyrolysis a reactor comprising a tubular reaction chamber having an inlet, a core positioned within the tubular reaction chamber and spaced from the walls thereof to form an annular passage way, means for transferring heat through the wall of the reaction chamber and the core to the annular passageway and an outlet longitudinally spaced from the reaction chamber inlet for removing pyrolyzed polymer from said chamber.

In other aspects of the invention, various combinations of the above inventive features are employed.

The olefins which are pyrolyzed in accordance with the method and apparatus of this invention comprise in general normally solid olefin polymers. These polymers can range from polymers of fairly low molecular weight to very high molecular weight (60,000 or higher), highly dense and highly crystalline polymers. The products of pyrolysis of these polymers can vary in physical characteristics from wax-like materials of low molecular weight and low melting point, obtained from pyrolyzing lower molecular weight polymers to tough, rigid, stiff, heat-resistant polymers having high tensile strength, obtained from pyrolysis of higher molecular weight polymers.

In a preferred polymerization method high molecular weight, highly dense crystalline polymers are prepared by the method described in detail in a copending application of Hogan and Banks Serial No. 573,877, filed March 26, 1956, now Patent No. 2,825,721. This particular method utilizes a chromium oxide catalyst containing hexavalent chromium associated with silica, alumina, zirconia, thoria etc. In one embodiment of this application, olefins are polymerized in the presence of a hydrocarbon diluent; for example, an acyclic, alicyclic or less preferably aromatic compound, which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either trans-internal or terminal vinyl depending on the particular process conditions employed.

The chromium oxide catalyst of Hogan and Banks can also be employed in the preparation of higher molecular weight and essentially insoluble polymers. In the preparation of these polymers, it is usually desirable that the reaction temperature be maintained at a lower level usually not exceeding about 220° F. The polymers which are obtained are normally insoluble in the reaction diluent employed and are of exceedingly high molecular weight, from 100,000 to 200,000 or higher.

It is also possible to prepare high molecular weight, highly dense crystalline polymers in the presence of organo-metallic compounds, such as triethylaluminum + titanium tetrachloride, mixtures of ethylaluminum halides with titanium tetrachloride, and the like. Another group of catalysts which is used comprises a halide of a group 4 metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

In general, the polymer pyrolysis treatment is carried out over a temperature range of from about 600 to 900° F. with a residence time range from 1 to about 30 minutes and a pressure of from about 1 to 1,000 p.s.i.a. or higher.

In carrying out the invention in one embodiment thereof, an olefin polymer, for example a high molecular weight highly dense crystalline ethylene polymer is introduced to a preheating zone wherein the polymer is preheated, usually to between about 150 and about 200° F. Following preheating the polymer is passed through an extruder, wherein the temperature is further increased and then into a pyrolysis zone wherein mild cracking or vis-breaking of the polymer takes place. The conditions employed in this zone are within the ranges hereinbefore set forth. The pyrolyzed polymer upon leaving the pyrolysis zone is introduced to a cooling or quench zone wherein the temperature is substantially reduced, usually to between about 250 and about 400° F. Cooling of the pyrolyzed polymer is provided by introducing a coolant fluid to the cooling zone, either in indirect heat exchange or more preferably in direct heat exchange with the hot polymer. After being so used, the coolant fluid is removed from the cooling zone and passed in heat exchange with the polymer in the preheating zone. Again the heat exchange employed may be indirect, however, direct heat exchange is usually preferred. Usually the heat required in the preheating zone does not exactly balance the heat removed in the quench or cooling zone, therefore, it is necessary to provide temperature control of the coolant by adding or subtracting heat from the coolant stream. Thus if the amount of heat picked up by the coolant in the cooling or quench zone is greater than that required in the preheating zone, a cooling means such as a heat exchanger can be placed in the coolant stream leaving the preheating zone, provision being made of course to partially by-pass said exchanger. On the other hand if more heat is required in the preheating zone than is available in the coolant liquid entering the zone, a heater can be provided in the coolant stream to increase the temperature of the coolant entering the preheating zone. Other schemes involving either direct or indirect heat exchange can also be provided to supplement the coolant fluid and thereby obtain the desired temperature control in the preheating and cooling zones.

One of the difficulties encountered in the treatment of olefin polymers at high temperatures is degradation of polymer, which results when the polymer is contacted with oxygen while in the heated state. Although such degradation of the polymer is not necessarily undesirable, it is within the scope of the invention to carry out cooling in the cooling and quenching zone in such a manner as to minimize polymer degradation. In one method of operation, this is effected by preventing oxygen from entering or remaining in the cooling or quench chamber. This result can be obtained by maintaining the cooling zone full of coolant fluid at all times or when a liquid coolant is employed by maintaining an inert gas pressure in the cooling zone. In another method of operation the problem of polymer degradation is minimized by quenching the pyrolyzed polymer entering the quench zone at a high rate of speed whereby the polymer remains at an elevated temperature, where degradation occurs, for only a very short period of time. It is possible to quench the polymer, for example, by the use of water at low pressure whereby the water is converted to steam and thereby reduce the temperature of the polymer from pyrolysis temperature to the desired temperature level in fractions of a second.

The coolant fluid which is employed in the foregoing process can be a gas or a liquid material which is inert and nondeleterious when brought in contact with the polymer at pyrolysis temperatures. Usually it is preferred to employ a normally liquid material because of the high heat capacity of liquid per unit of volume as compared with gases and also because it is possible in some instances to utilize the heat of vaporization of a liquid and thus obtain faster cooling. Specific examples of cooling fluids include materials such as nitrogen, carbon dioxide, water, high molecular weight alcohols and ethers, halogenated low-boiling paraffins which are normally employed as refrigerants, such as dichlorodifluoroethane, chlorotrifluoroethane, carbon tetrachloride, etc., polyhydric alcohols, such as diethyleneglycol and the like.

In one embodiment of the invention the preheated polymer is passed through a pyrolysis zone in the form of a fluid stream having an annular cross-section and heat is transferred to the polymer through both the interior and exterior boundaries of the annular stream. By utilizing this type of pyrolysis zone it is possible to provide a flowing stream of polymer having relatively small cross-section and a large surface-to-volume ratio whereby very close control of temperature and cracking time can be obtained. As a result it is possible to substantially reduce variations between skin temperature and the temperature in the body of the polymer and thus minimize excessive cracking at the walls of the pyrolysis zone. With a throughput of about 0.06 to about 0.1 g.p.m., the annular stream of polymer usually has a surface-to-volume ratio of between about 1:1 and about 10:1 in.$^2$/in.$^3$, and more preferably between about 2:1 and about 5:1 in.$^2$/in.$^3$ The quantity of polymer which can be passed through this type of pyrolysis zone varies depending on the size of the zone and the pressure employed for moving the polymer.

Figure 2:
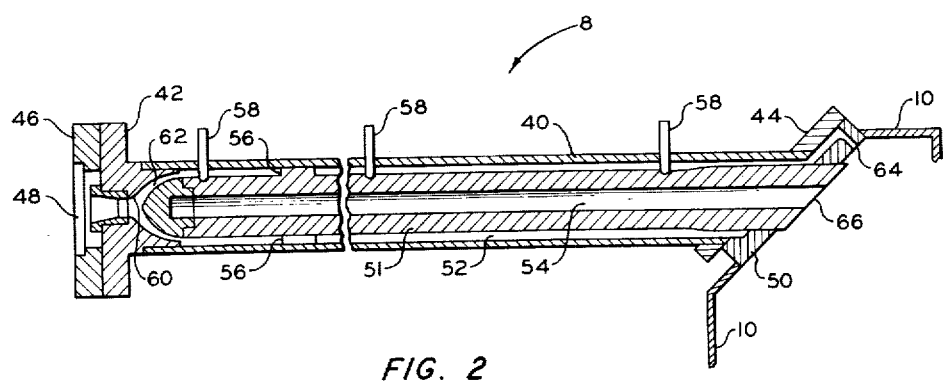

In order to more clearly describe the invention and provide a better understanding thereof, reference is had to the accompanying drawings of which FIGURE 1 is a diagrammatic illustration partially in cross-section of an apparatus suitable for carrying out one embodiment of the invention comprising in series a feed hopper and extruder, a reactor, quench chamber and a heat exchange system for passing a coolant fluid in a closed circuit between said feed hopper and quench chamber, and FIGURE 2 is a side view in cross-section of a reactor apparatus containing an annular passageway vis-breaking section.

The apparatus of FIGURE 1 comprises a feed hopper 1 having an upper section 2 and a lower heat exchange section 3 through which there are passed tubes which comprise heat exchanger 4. The outlet of heat exchange section 3 connects with extruder 6 which in turn discharges to horizontal reactor 8.

Reactor 8 (see FIGURE 2) comprises a tubular reaction chamber 40 having an inlet 48 flanged at 42 to the flanged outlet 46 of extruder 6; and a streamlined core 51 positioned co-axially within the reaction chamber to form an annular passageway 52 through said reactor. The reaction chamber 40 and core 51 terminate at the outlet end of the reactor in a common face which is beveled to face downward, the core and reactor being held in spaced position by spacers 56 and flanges 44 and 50, respectively. A constricted outlet 64 from the reaction chamber is provided in the upper part of flange 50. This outlet is constructed to allow the polymer to flow in a thin stream, thereby facilitating rapid heat transfer in quench chamber 10. The inlet face of core 51 is curved to form a convex surface 62 and reaction chamber 40 is flared from inlet 48 to provide a surface 60 generally parallel to the core face 62. Heating means (not shown) are provided for heating the external surface of the reactor 40 and the interior 54 of core 51. For example, the exterior of the reactor can be heated by an electrical coil and the interior of the core can be heated by a bayonet-type heater inserted through opening 66. At spaced intervals thermocouples 58 are provided, extending through the reactor wall and into core 51.

The outlet of reactor 8 is flanged at 45° to vertical quench chamber 10. Flanging the reactor in this manner facilitates the flow of polymer from the reactor and substantially eliminates "dead spots" where polymer might otherwise accumulate. Disposed in the quench chamber are a number of inverted V-type baffles 12 which are displaced horizontally and vertically from each other. Below the baffles in the lower portion of quench chamber is a doughnut-shaped ring 14 having a series of perforations in the upper portion thereof. An outlet 22 is provided in the upper portion of quench chamber 10, said outlet communicating with the inlet of exchanger 4 through conduit 26. Exchanger 4 is provided with an outlet conduit 28, which communicates through pump 18 and conduit 20 with ring 14. Quench chamber 10 is also provided with a lower outlet 16 containing a star valve 17.

In the operation of the apparatus of FIGURES 1 and 2 a polymer of a 1-olefin, for example, a highly dense and crystalline polymer of ethylene having a molecular weight of about 150,000, is introduced to feed hopper 1. The polymer passes down through the hopper and through exchanger 4 where it is heated by indirect heat exchange with a fluid introduced to the exchanger through conduit 26. The heated polymer, generally in the temperature range of 60 to 200° F., is then introduced to extruder 6. In the extruder, the polymer is thoroughly mixed and masticated, in the process being increased in temperature to about 375 to 600° F. When the polymer leaves the extruder, it passes through inlet 48 into reactor 8 where it enters into annulus 52. As the polymer passes through reactor 8 its temperature is increased to provide a moderate cracking or vis-breaking reaction. The cross-section of the flowing polymer is relatively small and by introducing heat to the polymer through both its exterior and interior boundaries it is possible to obtain close control over the temperature of the polymer in each portion of the reactor and thus provide the precise degree of cracking desired. The vis-broken polymer, now at a temperature of from about 600 to 900° F. passes from the reactor through opening 64 and enters quench chamber 10. In this chamber, the polymer is contacted with water introduced through conduit 20 and ring 14 at a temperature of about 200° F. Sufficient water is provided to cool the polymer from reaction temperature to between about 250 and about 400° F. The cool polymer passes downwardly through baffles 12 and out of the quench chamber through outlet 16. The pressure on the quench chamber is maintained at a suitable level, such that the entering water is converted to steam, which completely fills the quench chamber. The steam is withdrawn from the quench chamber through conduit 22 and compressor 24 and is passed through conduit 26 into exchanger 4. In exchanger 4, the steam loses heat to polymer in the feed hopper and is at least partially condensed. A mixture of condensate and steam leaves exchanger 4 through conduit 28 and is passed through conduit 30 and cooler 32 wherein the remaining steam is condensed and the water is returned to its original temperature. The water then passes through pump 18 and conduit 20 and is returned to the quench chamber.

The preceding discussion has been directed to a preferred embodiment of the invention, however, this is not intended in any limiting sense and it is within the scope of the invention to employ other process and apparatus for carrying out the invention, for example, the polymer feed exchanger instead of being located in the feed hopper can be located in the extruder. Also it is within the scope of the invention to utilize means other than an extruder for feeding polymer to the reactor. The invention can also be carried out by utilizing coolant fluids other than water and if desired the pressure on the quench chamber can be maintained at a suitable level to maintain the coolant fluid in the liquid state.

The following data are presented in illustration of one embodiment of the invention.

EXAMPLE I

Several batches of polyethylene were prepared in the presence of n-pentane and a catalyst comprising about 2.5 percent by weight of chromium as chromium oxide, containing hexavalent chromium, with silica-alumina, prepared by impregnating silica-alumina with a solution of chromium nitrate, followed by drying and activation in air at elevated temperatures. The conditions employed were as follows:

| | |
|---|---|
| Reactor temperature | 210° F. |
| Reactor pressure | 400–450 p.s.i.g. |
| Ethylene feed rate | 25–30 ft.³/hr. |
| Pentane feed rate | 1.0–1.3 g.p.h. |
| Slurry concentration in reactor | 15–20% solids by weight. |
| Catalyst concentration in reactor | 0.005–0.02% by weight of pentane. |

The several batches of polyethylene were blended to provide a composite polymer having a molecular weight of 125,000. This polymer was extruded through a metal pipe 18 inches long (⅜ inch I.D.) heated to a temperature of about 750–800° F. The residence time of the polymer was 5–8 minutes. The extruded polymer had a molecular weight of 47,800.

EXAMPLE II

Two ethylene polymers and one ethylene-butene-1 copolymer were prepared, using a catalyst similar to that of Example I, under the following conditions:

| | Ethylene Polymers | | Ethylene-butene-1 Copolymer |
|---|---|---|---|
| | A | B [1] | |
| Reactor Temperature, °F | 200–220 | 290 | 195 |
| Reactor Pressure, p.s.i.g | 250–450 | 420 | 220–250 |
| Olefin Feed Rate: | | | |
| Ethylene, c.f.h | 50 | 15,800 | 50 |
| Butene-1, 6PH | | | 0.1–0.2 |
| Diluent Feed Rate, 6PH | [2] 3.0 | [3] 1,170 | [2] 3.0 |
| Catalyst Concentration in Reactor, wt. percent based on diluent | 0.005–0.02 | 0.15 | 0.005–0.02 |
| Polymer Concentration in Reactor, wt. percent based on diluent | 15–20 | 2–13 | 15–20 |
| Molecular Weight of Product | 145,000 | 40,300 | 103,000 |

[1] Commercial plant.
[2] n-Pentane.
[3] Cyclohexane.

Each of the above polymers were vis-broken in apparatus similar to that of FIGURES 1 and 2, with the following results:

*Polymer B*

| Run No. | 1 | 2 | 3 | 4 | 5 | 6 | 7 |
|---|---|---|---|---|---|---|---|
| Residence time, min | 7 | 5 | 4 | 7 | 5 | 4 | 7 |
| Highest Temperature, °F | 710 | 710 | 710 | 760 | 760 | 760 | 660 |
| Throughput, lb./hr | 6–8 | 9–10 | 12–15 | 5–7 | 8–9 | 11–14 | 7–9 |
| Inherent Viscosity [1] | 0.60 | 0.63 | 0.37 | 0.20 | 0.31 | 0.39 | 0.51 |
| Molecular Weight [2] | 14,500 | 15,500 | 9,000 | 5,000 | 7,500 | 9,500 | 11,800 |
| Crystalline Freeze Pt., °F [3] | 247 | 250 | 250 | 238 | 243 | 248 | 250 |
| Specific Gravity | 0.967 | 0.967 | 0.966 | 0.963 | 0.967 | 0.963 | 0.966 |
| Shore D Hardness | too brittle | 67 | 67 | too brittle | too brittle | | 69 |
| Screw Speed | 20 | 30 | 40 | 20 | 30 | 40 | 20 |

[1] Measured on a solution of 0.2 gm. of polymer in 50 cc. of tetralin.
[2] Molecular wt.=24,500 × inherent viscosity. Method described by Kemp and Peters, Ind. Eng. Chem. 35, 1108 (1943) and by Dienes and Klemm, J. Applied Phys. 17, 458 (June 1946).
[3] Carried out by melting a sample of the polymer, inserting a thermocouple into the molten polymer and allowing the molten polymer to cool slowly. The temperature is recorded and is plotted on a chart versus time. The crystalline freeze point is the first plateau in the time-versus-temperature curve.

Polymer A

| Run No | 1 | 2 | 3 | 4 | 5 | 6 | 7 |
|---|---|---|---|---|---|---|---|
| Residence time, min | 7 | 5 | 4 | 7 | 5 | 4 | 7 |
| Highest Temperature, °F | 750 | 720 | 715 | 760 | 760 | 760 | 680 |
| Throughput, lb/hr | 5–6 | 6–7 | 9–10 | 5–6 | 6–7 | 8–9 | 6–8 |
| Inherent Viscosity [1] | 0.38 | 0.46 | 0.62 | 0.16 | 0.34 | 0.35 | 0.78 |
| Molecular Weight [2] | 9,200 | 11,100 | 15,100 | 3,800 | 8,500 | 8,600 | 19,000 |
| Crystalline Freeze Pt., °F [3] | 251 | 253 | 253 | 245 | 249 | 249 | 253 |
| Specific Gravity | 0.951 | 0.972 | 0.967 | 0.965 | 0.969 | 0.970 | 0.965 |
| Shore D Hardness | too brittle | too brittle | 70 | too brittle | too brittle | too brittle | 70 |
| Screw Speed | 20 | 30 | 40 | 20 | 30 | 40 | 20 |

[1] Measured on a solution of 0.2 gm. of polymer in 50 cc. of tetralin.
[2] Molecular wt.=24,500 × inherent viscosity. Method described by Kemp and Peters, Ind. Eng. Chem. 35, 1108 (1943) and by Dienes and Klemm, J. Applied Phys. 17, 458 (June 1946).
[3] Carried out by melting a sample of the polymer, inserting a thermocouple into the molten polymer and allowing the molten polymer to cool slowly. The temperature is recorded and is plotted on a chart versus time. The crystalline freeze point is the first plateau in the time-versus-temperature cruve.

Ethylene-Butene-1 Copolymer

| Run No | 1 | 2 | 3 | 4 | 5 | 6 | 7 |
|---|---|---|---|---|---|---|---|
| Residence time, min | 7 | 5 | 4 | 7 | 5 | 4 | 7 |
| Highest Temperature, °F | 740 | 710 | 710 | 765 | 760 | 760 | 650 |
| Throughput, lb/hr | 5–6 | 6–7 | 9–10 | 5–6 | 6–7 | 8–9 | 6–8 |
| Inherent Viscosity [1] | 0.32 | 0.48 | 0.63 | 0.29 | 0.36 | 0.46 | 1.10 |
| Molecular Weight [2] | 7,800 | 11,800 | 15,300 | 7,000 | 8,900 | 11,200 | 26,700 |
| Crystalline Freeze Pt., °F [3] | 246 | 246 | 247 | 243 | 246 | 244 | 246 |
| Specific Gravity | 0.952 | 0.951 | 0.950 | 0.947 | 0.951 | 0.951 | 0.946 |
| Shore D Hardness | too brittle | 63 | 65 | too brittle | too brittle | 62 | 62 |
| Screw Speed | 20 | 30 | 40 | 20 | 30 | 40 | 20 |

[1] Measured on a solution of 0.1 gm. of polymer in 50 cc. of tetralin.
[2] Molecular wt.=24,500 × inherent viscosity. Method described by Kemp and Peters, Ind. Eng. Chem. 35, 1108 (1943) and by Dienes and Klemm, J. Applied Phys. 17, 458 (June 1946).
[3] Carried out by melting a sample of the polymer, inserting a thermocouple into the molten polymer and allowing the molten polymer to cool slowly. The temperature is recorded and is plotted on a chart versus time. The crystalline freeze point is the first plateau in the time-versus-temperature curve.

The results obtained in Example I can be compared with runs 1, 4 and 5 of polymer A. It is apparent that the apparatus of this invention provides a substantially more vis-breaking under the same operating conditions than the heated pipe of Example I.

Having thus described the invention by providing a specific example thereof it is to be understood that no undue limitations or restrictions are to be drawn by reason thereof and that many variations and modifications are within the scope of the invention.

I claim:

1. In a process for the pyrolysis of a high molecular weight, normally solid polymer of an olefin to produce a lower molecular weight normally solid pyrolyzed polymer, the improvement which comprises passing said polymer through a pyrolysis zone in the form of a fluid stream having annular cross section, and transferring heat of pyrolysis to said polymer through both the exterior and the interior boundaries of the annular stream.

2. In a process for the pyrolysis of a normally solid polymer of an olefin, the improvement which comprises in combination: preheating said polymer in a preheating zone, forcing preheated polymer, in the form of a fluid stream of annular cross section through a pyrolysis zone, in said pyrolysis zone imparting heat of pyrolysis to said polymer both through the exterior and the interior boundaries of the annular stream, passing a resulting pyrolyzed polymer into a vertical quenching zone, passing pyrolyzed polymer downwardly and coolant fluid upwardly through said quenching zone, recovering pyrolyzed polymer from a lower part of said quenching zone, withdrawing coolant fluid from an upper part of said quenching zone, passing said fluid to said preheating zone and therein imparting heat from said fluid to said polymer, further cooling at least part of said fluid, and returning thus cooled fluid to said quenching zone.

3. The process of claim 2 in which the coolant fluid is water.

4. The process of claim 2 wherein said polymer is a polymer of ethylene and said pyrolysis is effected at a temperature in the range 600 to 900° F.

5. The process of claim 2 wherein said polymer is a polymer of propylene and said pyrolysis is effected at a temperature in the range 600 to 900° F.

6. An improved pyrolysis reactor comprising, in combination: a tubular reaction chamber having an inlet; a core positioned within said tubular chamber and spaced from the walls thereof to form an annular passageway through said reaction chamber; means for transferring heat through the outer wall of said reaction chamber into said passageway; means for supplying heat through said core into said passageway; said tubular reaction chamber and said core terminating in a beveled face at the end of the reactor opposite said inlet; and a constricted outlet passage in said beveled face adjacent the major longitudinal dimension of said reaction chamber.

7. In an apparatus for effecting the pyrolysis of normally solid hydrocarbon polymer, an improved pyrolysis reactor, comprising, in combination: a tubular reaction chamber having an inlet; a streamlined core positioned coaxially within said reaction chamber to form an annular passageway therethrough; means for transferring heat through the exterior wall of said reaction chamber into said passageway; means for supplying heat through said core into said passageway; said reaction chamber and said core terminating in a common face at the outlet end of the reactor, said face being beveled to face downward; and a constricted outlet in the upper part of said beveled face.

References Cited in the file of this patent

UNITED STATES PATENTS

| | | |
|---|---|---|
| 1,080,938 | Still | Dec. 9, 1913 |
| 2,155,853 | Anthony | Apr. 25, 1939 |
| 2,186,916 | Gaylor | Jan. 9, 1940 |
| 2,239,501 | Frolich et al. | Apr. 22, 1941 |
| 2,367,173 | Martin | Jan 9, 1945 |
| 2,480,615 | Strain | Aug. 30, 1949 |

FOREIGN PATENTS

| | | |
|---|---|---|
| 569,043 | Great Britain | May 2, 1945 |

Notice of Adverse Decision in Interference

In Interference No. 94,243 involving Patent No. 3,087,922, W. H. Whittington, METHOD AND APPARATUS FOR PYROLYZING POLYMERS, final judgment adverse to the patentee was rendered Oct. 15, 1965, as to claim 1.

[*Official Gazette December 14, 1965.*]